(12) United States Patent  
Zheng

(10) Patent No.: US 7,988,322 B2
(45) Date of Patent: Aug. 2, 2011

(54) DECORATIVE LAMP

(75) Inventor: Shi-Song Zheng, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 130 days.

(21) Appl. No.: 12/465,650

(22) Filed: May 14, 2009

(65) Prior Publication Data

US 2010/0238657 A1    Sep. 23, 2010

(30) Foreign Application Priority Data

Mar. 21, 2009  (CN) .......................... 2009 1 0301015

(51) Int. Cl.
*F21V 7/20* (2006.01)
*F21V 29/00* (2006.01)

(52) U.S. Cl. .............. 362/218; 362/249.02; 362/565; 362/605; 362/612; 362/616; 362/294; 362/373; 362/806

(58) Field of Classification Search ............ 362/218, 362/235, 249.02, 249.06, 294, 373, 565, 362/601, 602, 604, 605, 612, 616, 806
See application file for complete search history.

(56) References Cited

U.S. PATENT DOCUMENTS

| 2,359,559 | A | * | 10/1944 | Horky | 362/565 |
| 4,843,524 | A | * | 6/1989 | Krent et al. | 362/605 |
| 7,182,492 | B1 | * | 2/2007 | Walter | 362/612 |

* cited by examiner

*Primary Examiner* — Stephen F Husar
(74) *Attorney, Agent, or Firm* — Frank R. Niranjan

(57) ABSTRACT

A decorative lamp includes an opaque bracket, an opaque cover, a transparent light source consisting of a plurality of LEDs and a light guiding sheet. The cover engages with the bracket to define a chamber between the bracket and the cover. A slit is defined in the cover and communicates with the chamber. The light source is received in the chamber of the bracket and the cover and thermally connects with a heat sink in the chamber. The light guiding sheet includes a first end filled in the slit of the cover and a terminal second end opposite to the first end and located at outside of the cover. Light emitted from the light source travels to an outside of the decorative lamp along the light guiding sheet.

14 Claims, 4 Drawing Sheets

DECORATIVE LAMP

BACKGROUND

1. Technical Field

The present invention relates to decorative lamps and, more particularly, to a decorative lamp having a simple configuration and a fancy appearance.

2. Description of Related Art

Appearances of lamps are become more and more fancy to meet the consumer. Generally, a lamp comprises a holder and a number of light sources are mounted on the holder. Each of the light sources has a positive electrode and a negative electrode which electronically connect with a control portion. When the control portion of the lamp is operated, all or part of the light sources are driven to emit a decorative light. The configuration of the lamp is complex and a manufacture process thereof is time-consuming and trouble.

For the foregoing reasons, there is a need in the art for a decorative lamp which can overcome the limitations described.

DETAILED DESCRIPTION

Figure 1:
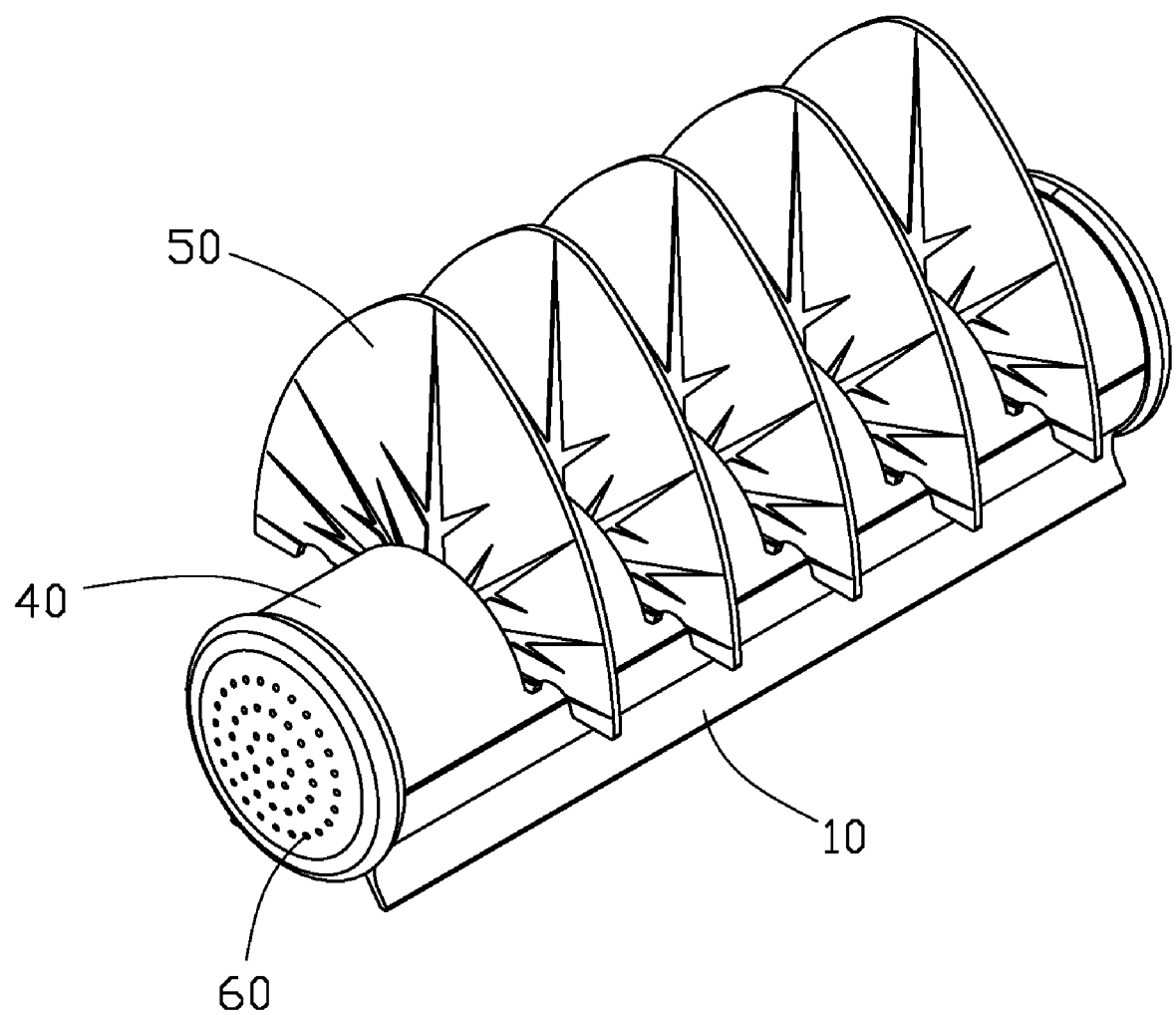
FIG. 1 is an assembled view of a decorative lamp in accordance with an embodiment of the present disclosure.
Figure 2:
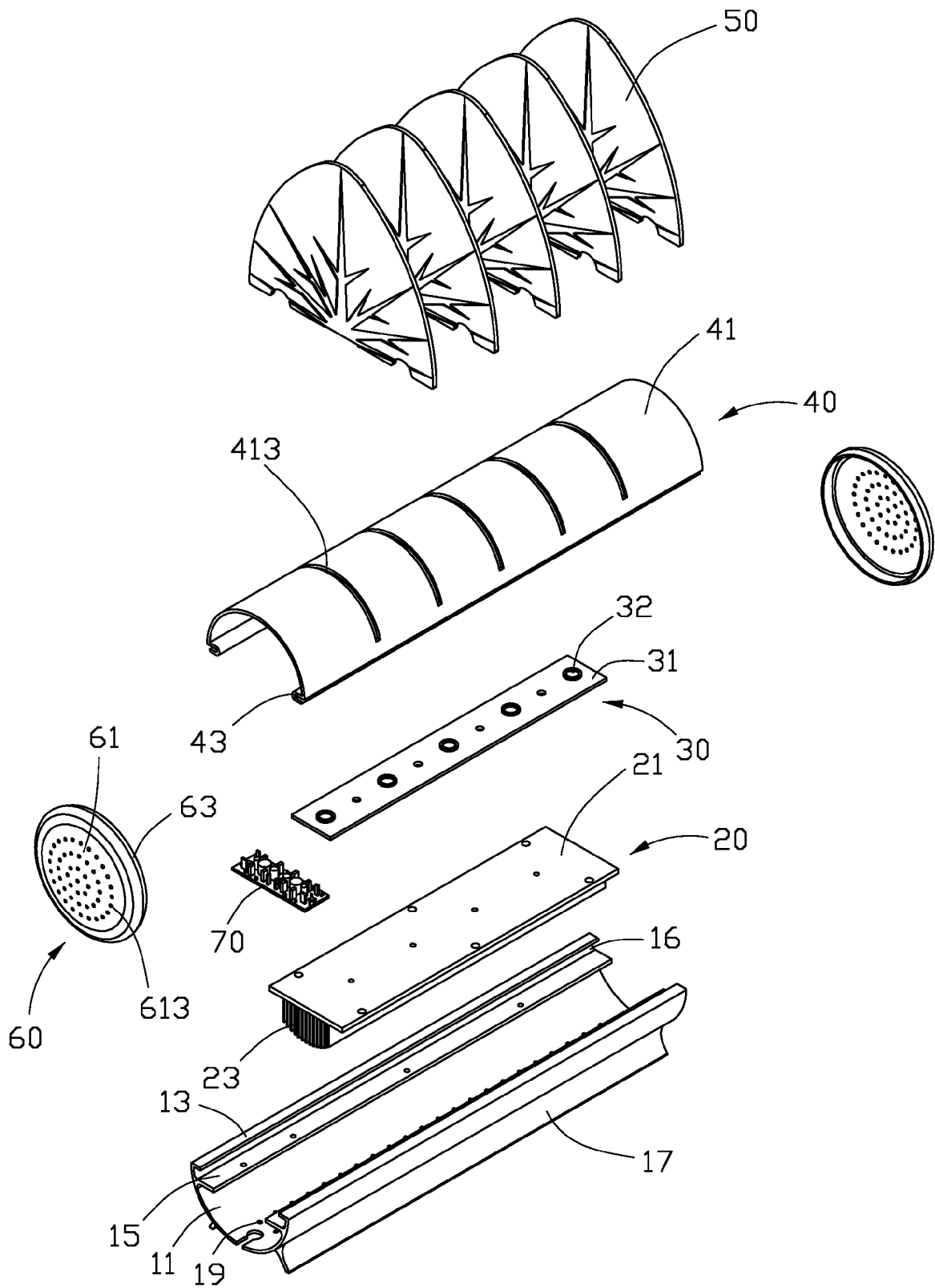
FIG. 2 is an exploded view of the decorative lamp in FIG. 1.

Referring to FIGS. 1-2, an embodiment of a decorative lamp comprises a bracket 10, a heat sink 20 received in the bracket 10, an LED module 30 mounted on the heat sink 20, a cover 40 fixed on a top portion of the bracket 10 and covering the heat sink 20 and the LED module 30, a number of light guiding sheets 50 mounted on the cover 40, and two lids 60 mounted on opposite ends of the bracket 10. A driving circuit module 70 is mounted on the heat sink 20 and electronically connects with the LED module 30.

Figure 3:
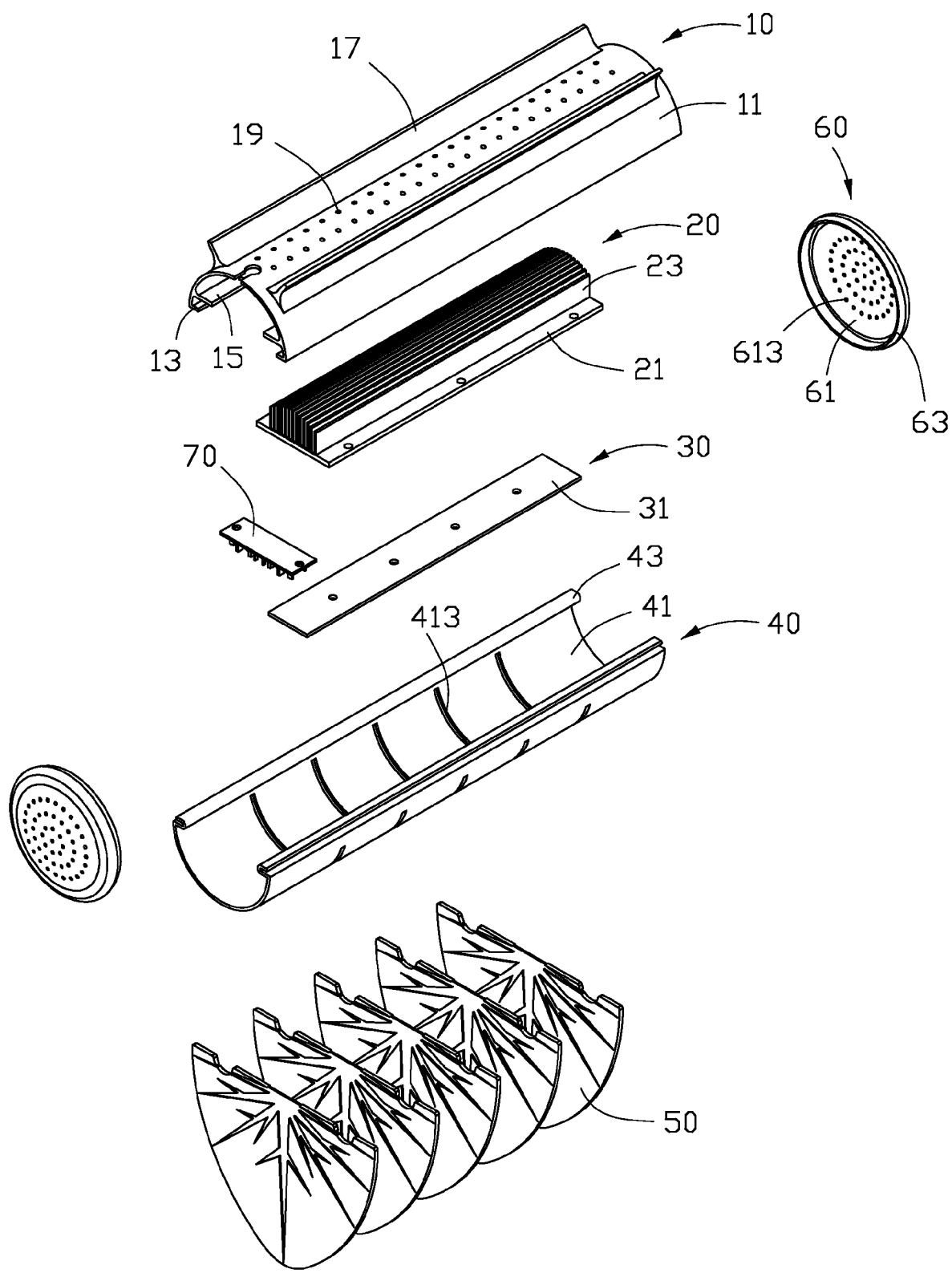
FIG. 3 is an inverted view of FIG. 2.

Referring to FIG. 3 also, the bracket 10 is integrally formed as a monolithic piece by aluminum extrusion. The bracket 10 comprises an arc-shaped bottom portion 11, two extending portions 13 and two supporting portions 15. The bottom portion 11 comprises a convex outer surface and a concave inner surface opposite to the outer surface. A central portion of the bottom portion 11 defines a number of through holes 19 therein. The through holes 19 are divided into two rows along a length direction of the bottom portion 11. Cool air can enter the decorative lamp via the through holes 19 to cool the LED module 30. Two elongated and spaced arms 17 extend downwardly and outwardly from the outer surface of the bottom portion 11 along the length direction of the bottom portion 11. The through holes 19 are located between the arms 17. The arms 17 are used for sitting on a supporting structure (not shown), for example, a counter, when the decorative lamp is put on the supporting structure.

The extending portions 13 extend inwardly from two tops of opposite sides of the bottom portion 11 along a length direction of the bottom portion 11. The extending portions 13 are parallel to and face each other. The supporting portions 15 extend inwardly from the inner surface of the bottom portion 11 along a length direction of the bottom portion 11. The supporting portions 15 face and are parallel to each other. The supporting portion 15 is located below a corresponding extending portion 13 and parallel to the corresponding extending portion 13. A length of the extending portion 13 is equal to that of the supporting portion 15. A width of the extending portion 13 is smaller than that of the supporting portion 15. A guiding groove 16 is defined between the extending portion 13 and the supporting portion 15.

The heat sink 20 comprises an elongated base 21 and a plurality of elongated fins 23 extending downwardly from a central portion of a bottom surface of the base 21. The fins 23 are spaced from and parallel to each other. A height of the fins 23 are gradually decreased along a direction from a central one towards lateral ones of the fins 23. A length of the base 21 is shorter than that of the supporting portion 15 of the bracket 10. A width of the base 21 is slightly larger than a distance between confronting ends of the supporting portions 15. Opposite sides of the bottom surface of the base 21 abut against top surfaces of the supporting portions 15.

The LED module 30 comprises an elongated printed circuit board 31 and five evenly spaced LEDs 32 mounted on the printed circuit board 31. The printed circuit board 31 is shorter than the base 21 of the heat sink 20 and is mounted on a top of the base 21. The LEDs 32 may have different colors or have the same color. The driving circuit module 70 is mounted on the supporting portions 15 beside the base 21 and electronically connects with the LEDs 32 via the printed circuit board 31.

The cover 40 is integrally formed by a metal sheet or an opaque plastic sheet. The cover 40 comprises an arc-shaped body 41 and two guiding portions 43 formed at lateral ends of the body 41. Five arc-shaped, evenly spaced and parallel slits 413 are transversely defined in the body 41 to receive the light guiding sheets 50 therein. Each guiding portion 43 extends inwardly from a bottom of the body 41. Each of the guiding portions 43 has a U-shaped configuration with an opening (not labeled) oriented outwardly. A height of the guiding portion 43 is slightly smaller than a depth of the guiding groove 16 of the bracket 10. A width of the guiding portion 43 approaches that of the extending portion 13 of the bracket 10. The guiding portion 43 engages with a corresponding extending portion 13 by inserting the corresponding extending portion 13 into the opening of the guiding portion 43. When the cover 40 and the bracket 10 are assembled together, the body 41 and the bottom portion 11 of the bracket 10 are toward opposite directions and cooperatively form a cylindrical tube (not labeled). The two lids 60 are mounted on opposite ends of the tube constructed by the bracket 10 and the cover 40.

Each of the lids 60 comprises a circular sidewall 61 and an annular connecting portion 63 extending from an edge of the sidewall 61. A number of through holes 613 are defined in the sidewall 61. The through holes 613 are divided into a number of homocentric circularities. A part of light emitted from the LED modules 30 travels to the environment from the through holes 613 and forms a special image consisting of a plurality of light spots at the number of homocentric circularities. The connecting portion 63 engages a corresponding one of the opposite ends of the tube constructed by the bracket 10 and the cover 40 and abuts against outer surfaces of the body 41 and the bottom portion 11.

Each of the light guiding sheet 50 is a transparent or semi-transparent arch-shaped sheet. A width of the light guiding sheet 30 decreases from a bottom to top. The light guiding sheets 50 may have different colors or the same color. A bottom end of the light guiding sheet 50 is inserted in a corresponding slit 413 of the cover 40. When the light guiding sheets 50 are mounted on the cover 40, the light guiding sheets 50 are spaced from and parallel to each other.

In assembly, the opposite sides of the bottom surface of the base 21 are fixed on the top surfaces of the supporting portions 15 to mount the heat sink 20 on the bracket 10. The LED module 30 is mounted on the top of the base 21. The guiding portions 43 of the cover 40 clamp the extending portions 13 therein, respectively, thereby securing the cover 40 on the bracket 10. The lids 60 are mounted on the opposite ends of the tube formed cooperatively by the bracket 10 and the cover 40. The light guiding sheets 50 are mounted on the cover 40. In this state, the bottom ends of the light guiding sheets 50 fill in the slits 413 of the cover 40.

Figure 4:
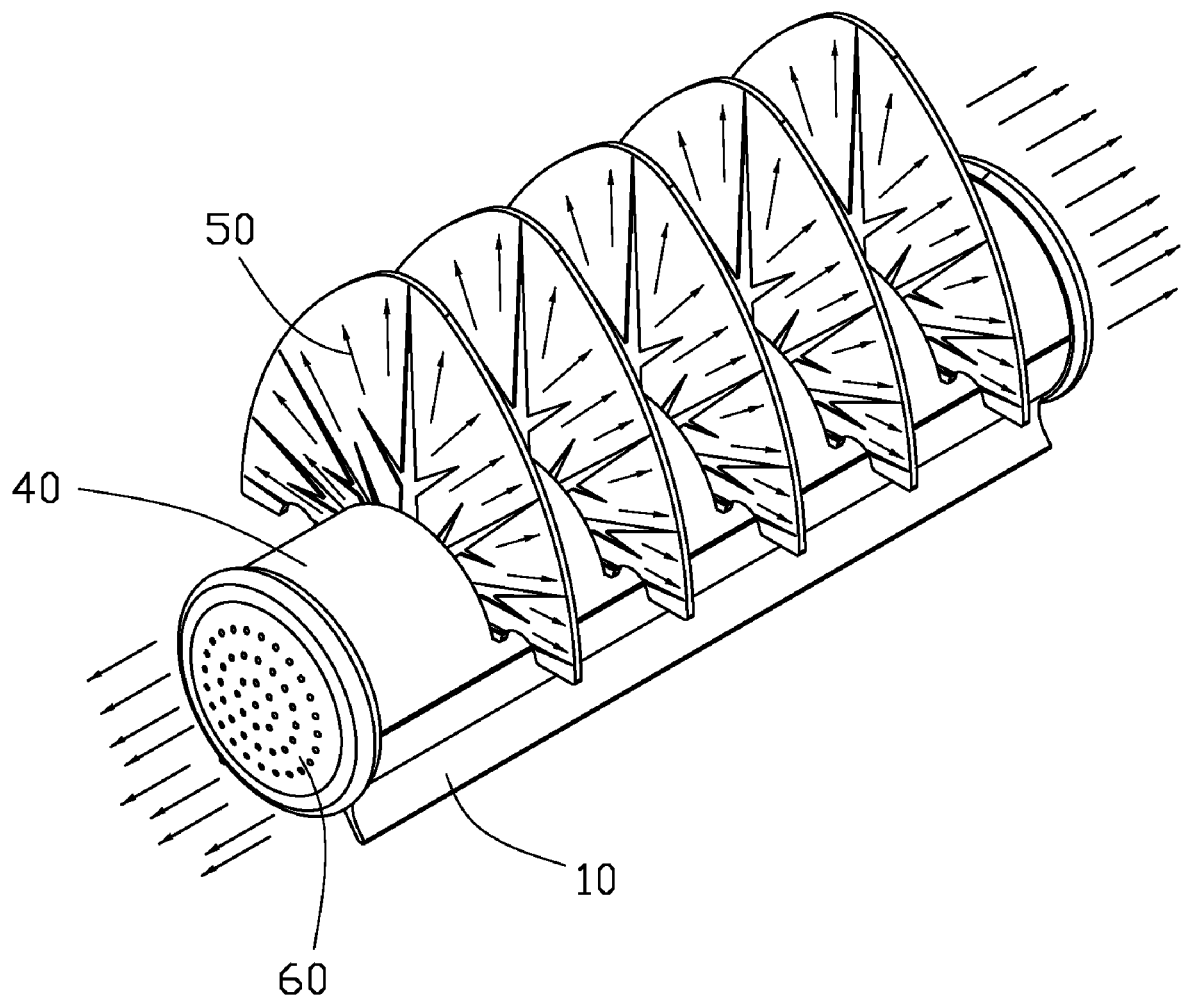
FIG. 4 is a schematic view of the decorative lamp with arrows indicating the light emissions of the decorative lamp.

Referring to FIG. 4, in use, light emitted from the LEDs 32 of the LED module 30 travels to the environment along the light guiding sheets 50 and from the through holes 613 of the lids 60 to make the decorative lamp look fancy to achieve a decorative objective.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A decorative lamp comprising:
   an opaque bracket;
   an opaque cover engaging with the bracket to define a chamber between the bracket and the cover, a slit defined in the cover and communicating with the chamber;
   a light source made of at least a light emitting diode being received in the chamber of the bracket and the cover; and
   a transparent light guiding sheet comprising a first end filled in the slit of the cover and a terminal second end opposite to the first end, the second end located at an outside of the cover;
   wherein light emitted from the light source travels to an outside of the decorative lamp along the light guiding sheet, the bracket comprises a bottom portion and two extending portions formed at tops of opposite sides of the bottom portion, the cover comprises a body and two guiding portions formed at bottoms of opposite ends of the body, the two guiding portions of the cover clamp the extending portions of the bracket therein, respectively, and the body of the cover and the bottom portion of the bracket cooperatively define the chamber.

2. The decorative lamp as claimed in claim 1, wherein the body of the cover and the bottom portion of the bracket are arc-shaped and convex, and the body and the bottom portion are toward opposite directions.

3. The decorative lamp as claimed in claim 2, wherein the bottom portion of the bracket defines a plurality of through holes, airflow enters the decorative lamp from the through hole to cool the light source.

4. The decorative lamp as claimed in claim 2, wherein two arms extend downwardly and outwardly from a bottom surface of the bottom portion of the bracket.

5. The decorative lamp as claimed in claim 2, wherein the slit is arc-shaped and defined in the body of the cover.

6. The decorative lamp as claimed in claim 2, wherein the decorative lamp further comprises additional slits evenly defined in the body of the cover and additional light guiding sheets engaged in the additional slits, respectively.

7. The decorative lamp as claimed in claim 6, wherein the additional slits are parallel to the slit and to each other, and the additional slits and the slit are equidistant from each other.

8. The decorative lamp as claimed in claim 6, wherein the light guiding sheet and the additional light guiding sheets each are arch-shaped, and a width of the light guiding sheet decreases from the first end to the second end.

9. The decorative lamp as claimed in claim 8, wherein the light guiding sheet and the additional light guiding sheets are spaced from and parallel to each other.

10. The decorative lamp as claimed in claim 1, wherein two lids are mounted on opposite ends of the chamber of the bracket and cover, each of the lids comprises a sidewall and a connecting portion extending from an edge of the sidewall, the sidewalls of the lids sandwich the bracket and the cover therebetween, and the connecting portions abut against outer surfaces of the bracket and the cover.

11. The decorative lamp as claimed in claim 10, wherein the sidewall of each of the lids defines a plurality of through holes, light emitted from the light source travels to the environment from the through holes.

12. The decorative lamp as claimed in claim 1, wherein the bracket comprises two supporting portions located below the extending portions, respectively, the extending portions and the supporting portions are spaced from each other to define the two guiding grooves between the extending portions and the supporting portions.

13. The decorative lamp as claimed in claim 12, wherein a base of a heat sink abuts against top surfaces of the supporting portions and the light source is mounted on the base of the heat sink.

14. The decorative lamp as claimed in claim 13, wherein the light source comprises a printed circuit board mounted on the base, and the at least a light emitting diode is mounted on the printed circuit board.

* * * * *